United States Patent [19]
Evanyk

[11] Patent Number: 5,930,728
[45] Date of Patent: Jul. 27, 1999

[54] UP CONVERTED HOME BASE STATION

[75] Inventor: Walter R. Evanyk, Plano, Tex.

[73] Assignee: Ericsson Inc., Research Triangle Park, N.C.

[21] Appl. No.: 08/697,742

[22] Filed: Aug. 29, 1996

[51] Int. Cl.[6] .................................................. H04Q 7/20
[52] U.S. Cl. ........................ 455/561; 455/426; 455/462; 455/553
[58] Field of Search .................................. 455/403, 422, 455/426, 450, 462, 464, 550, 552, 553, 566, 567, 575, 11.1, 561, 562

[56] References Cited

U.S. PATENT DOCUMENTS

| | | | |
|---|---|---|---|
| 4,543,451 | 9/1985 | Schon . | |
| 4,790,000 | 12/1988 | Kinoshita | 379/59 |
| 4,989,230 | 1/1991 | Gillig et al. | 379/59 |
| 5,127,042 | 6/1992 | Gillig et al. | 379/59 |
| 5,152,002 | 9/1992 | Leslie et al. | 455/11.1 |
| 5,249,302 | 9/1993 | Metroka et al. | 455/11.1 |
| 5,309,502 | 5/1994 | Hirai | 379/59 |
| 5,353,331 | 10/1994 | Emery et al. | 379/58 |
| 5,367,558 | 11/1994 | Gillig et al. | 379/59 |
| 5,392,462 | 2/1995 | Komaki | 455/89 |
| 5,408,679 | 4/1995 | Masuda | 455/11.1 |
| 5,408,681 | 4/1995 | Ressler et al. | 455/17 |
| 5,410,737 | 4/1995 | Jones | 455/56.1 |
| 5,422,934 | 6/1995 | Massa | 379/61 |
| 5,428,668 | 6/1995 | Dent et al. | 379/59 |
| 5,463,674 | 10/1995 | Gillig et al. | 379/59 |
| 5,469,496 | 11/1995 | Emery et al. | 379/58 |
| 5,497,507 | 3/1996 | Komaki | 455/89 |
| 5,544,171 | 8/1996 | Godecker | 455/561 |
| 5,570,354 | 10/1996 | Rainer . | |
| 5,742,640 | 4/1998 | Haoui et al. | 455/561 |

FOREIGN PATENT DOCUMENTS

| | | |
|---|---|---|
| 0119602 | 9/1984 | European Pat. Off. . |
| 0688139 | 12/1995 | European Pat. Off. . |
| WO 94/05127 | 3/1994 | WIPO . |
| WO 94/28641 | 12/1994 | WIPO . |

OTHER PUBLICATIONS

PCT International Search Report, Feb. 24, 1998, File No. PCT US 97/15035.

Primary Examiner—Dwayne D. Bost
Assistant Examiner—Nay A. Mauna
Attorney, Agent, or Firm—Jenkens & Gilchrist

[57] ABSTRACT

A communication system for wireless dual purpose phones operable at 1900 megahertz in the PCS system includes a plurality of transceivers wherein at least three communication links are formed. A first communication link is formed between the dual purpose phone and a base station of a cellular network. A second communication link is formed between the dual purpose phone and an antenna placed within an elevated location such as an attic. The antenna is placed in an elevated location to facilitate 1900 megahertz communications with the dual purpose phone throughout the business or home. The third communication link is between a transceiver proximately located and coupled to the elevated antenna and at a transceiver at an accessible location for the user. The use of multiple transceivers to place the antenna in an elevated location avoids a need to use a large, inflexible and aesthetically unappealing coaxial cable between the base unit and the elevated antenna.

13 Claims, 3 Drawing Sheets

UP CONVERTED HOME BASE STATION

BACKGROUND OF THE INVENTION

1. Field of the Invention

This invention relates to wireless communication devices capable of communication with existing wireless communication networks as well as with wireline networks.

2. Description of Related Art

Wireless communication networks typically include a plurality of specified cellular service areas through which a wireless phone, or mobile station, may pass while engaging in a conversation. As the mobile station leaves one cell area and enters another cell area, the wireless communication network must hand off control and data traffic channels to the new cell area base station.

Cordless telephones, on the other hand, tend to be simpler and require less sophisticated control and management. Typically, a cordless phone is designed to communicate only with its base unit. If a cordless telephone travels beyond the range of the base unit, the call is dropped. The ongoing conversation is not handed off to another base unit.

As a part of the Personal Communication System ("PCS") being developed in tested in various areas, there is a desire to develop a wireless dual use phone system that is capable of operating both as a cordless home phone and as a wireless mobile station capable of communicating with wireless communication networks. As the design of such dual use telephones progresses, however, several problems with implementing such a system are being discovered.

Under the PCS network, mobile stations are operable with 1900 megahertz (MHz) frequency band. The newest technology cordless phones, however, are operable in the 900 MHz frequency band. One known advantage of using 900 MHz as the operating frequency for a cordless phone is that a signal at 900 MHz may readily be propagated throughout a small structure such as a home or office more readily than prior cordless phone systems that operate at lower frequencies. The signal quality and resulting voice quality is improved in relation to many previous cordless phone systems.

As a result, current design effort includes developing dual use phones operable to communicate both with a base unit within the home and with a base station of a cellular communication network. Relating to the 1900 MHz systems that are being developed, however, it has been discovered that obtaining proper coverage throughout the home or small office in which a cordless phone is operating at a 1900 MHz frequency band. It has been found that a signal operation in the 1900 MHz frequency band does not propagate well throughout a house or small office if the cordless phone's base unit antenna, which is structurally coupled to the base unit, is kept at or near ground level. Because base units are operable not only to communicate with the cordless unit and the public switched telephone network ("PSTN"), but also to charge the batteries of the cordless phone, base units are kept at or nearly at ground level so that the base unit remains accessible for receiving in the cordless phone to recharge its batteries. Thus, current design proposals for dual purpose phones operable at a 1900 MHz frequency band for communications with base stations as well as with base units is problematic.

Accordingly, several design proposals have been urged for PCS based dual purpose phones to overcome the known signal coverage area problems which exist for 1900 MHz transmissions. One proposal is to use dual purpose phones which communicate with the cellular base stations at a frequency of 1900 MHz and which communicate with the base units of the phone at a lower frequency, by way of example, 900 MHz. One drawback to this proposal, however, is that a mobile station or phone must include additional circuitry to communicate with both types of phone systems at two frequency bands, namely, 900 MHz and 1900 MHz systems.

Another proposal is to place the base unit antenna for communication with a dual purpose phone above the ceiling in an attic or the like. The coverage area for a 1900 MHz system can be improved by raising the elevation of an antenna of a base unit operable at 1900 MHz. Accordingly, it is thought that the antenna could be removed from the base unit of the base terminal and could be connected to the base unit by a coaxial wire. A problem with placing the antenna in an attic or other raised elevation, however, is that a large coaxial cable must be used to carry a 1900 MHz signal as a result of cable attenuation resulting from these frequencies. By "large", it is believed that a cable with approximately a ¾ inch diameter must be used.

Using such a large coaxial cable is problematic for several reasons. First, ¾ inch coaxial cable tends to be very rigid and difficult to work with and difficult to route from one point to another. Secondly, and perhaps more importantly, ¾ inch coaxial cable is aesthetically unappealing. Few people would not complain about having a ¾ inch cable stapled to a wall and running up into a ceiling. It appears, therefore, that placing an antenna in an attic or at an adequate height to facilitate 1900 MHz communications with a cordless phone or mobile station is a difficult solution. What is needed, therefore, is a system that supports the design and used of dual purpose phone, namely PCS cellular and cordless, which dual purpose phone operates at a frequency of 1900 MHz and which avoids the noted problems that exist for current and proposed systems.

SUMMARY OF THE INVENTION

A communication system includes a dual purpose phone operable at 1900 MHz as a mobile station as well as cordless phone. In order to improve a coverage area from a cordless phone having a base unit with an antenna, the antenna is separated from the base unit and is coupled thereto by a communication link operable at a different and lower frequency. To create this lower frequency communication link between the antenna and the base unit transceiver, additional transceiver circuitry is added to support the lower frequency communication. In one embodiment, the communication link is a wireless link operable at 900 MHz. In another embodiment, the communication link carries a 900 MHz signal but includes a coaxial cable for transmitting the signal. By transmitting a signal from a base unit to a base unit antenna coupled to a transceiver proximately located to the antenna and coupled thereto at a lower frequency, a large coaxial cable is no longer required because the cable attenuation is lower at these frequencies. Smaller coaxial cable is beneficial because it is easier to install, costs less, and is more aesthetic.

For each of the embodiments, sensory signals are output by sensory signal producing devices to inform the user whether the phone is coupled through the base unit to the PSTN at no unit cost for the call or to the cellular network which, frequently, operate at a unit cost per call. Sensory signal producing devices are defined herein as any type device that produces at least one of sound, light, heat, or motion to create an effect capable of detection by the human senses. By way of example, a light source, a tone generator or a vibrating mechanism could be used to generate the sensory signals to inform the user as to whether the dual purpose phone is communicating traffic signals with the base unit and the PSTN or with a base station of a cellular network. In one embodiment, the sensory devices are collocated with the base unit. For this embodiment, the sensory device is most effective if the user is within the same area as the base unit. Failure of the user to be proximately located to the base unit could result in the user not perceiving the sensory information being provided by the sensory device.

In another embodiment, the sensory device is collocated with the mobile station or dual purpose phone itself. An advantage of this embodiment is that the sensory information is always generated in proximate location to the user and therefor improves the likelihood that the user will perceive the sensory information.

In yet another embodiment of the invention, the base unit includes two separated portions. A first portion includes no communication circuitry for receiving or transmitting communication traffic. Rather, the first portion includes no communication circuitry for receiving or transmitting communication traffic the first portion includes the phone socket for receiving the phone and for charging its internal battery or batteries. A second portion, however, contains the communication circuitry and is collocated with the antenna. In this embodiment, the need for a communication link from the ground level to the antenna is avoided. This separated second portion of the base unit, then, is directly coupled to a phone line and to the PSTN from its elevated location.

As may be seen, each of the above embodiments of the invention includes a dual purpose telephone for communication with a PCS cellular network as well as with a base unit of a cordless phone system. The problem utilizing a dual frequency system is avoided as is the problem of having to use large coaxial cables to couple the base unit to the elevated antenna.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
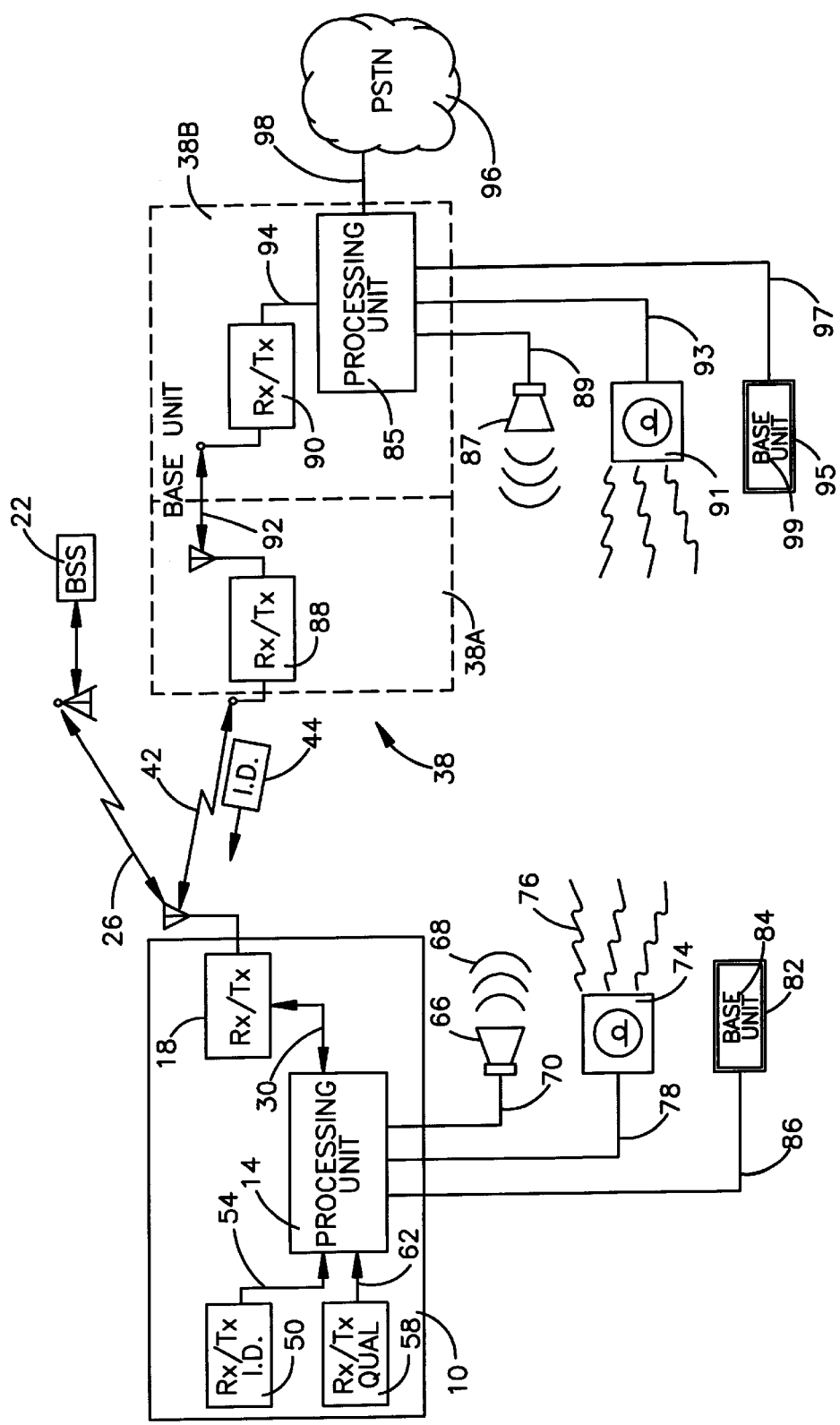
FIG. 1 is a functional block diagram of a first embodiment of a communication system.

Referring to FIG. 1, a functional block diagram of a communication system including a dual purpose phone ("DPP") 10 is shown. DPP 10 includes a processing unit 14 for controlling operation of DPP 10. Transceiver 18, for communicating with a cellular network base station system ("BSS") 22 in the 1900 MHz frequency band over communication link 26, is coupled to processing unit 14 by line 30. Transceiver 18 is also for communicating with a base unit 38 in the 1900 MHz frequency band over communication link 42. Store 50, for storing a base unit 38 ID, is coupled to processing unit 14 by line 54. Store 58, for storing at least one received signal quality threshold value, is coupled to processing unit 14 by line 62. Speaker 66, for producing sound 68 to indicate which communication link 26 or 42 is carrying the voice traffic, is coupled to processing unit 14 by line 70. Light source 74, for producing light 76 to indicate which communication link 26 or 42 is carrying the voice traffic, is coupled to processor 14 by line 78. Display 82, for producing visible alphanumeric and symbolic characters 84 to indicate which communication link 26 or 42 is carrying the voice traffic, is coupled to processor 14 by line 86.

Transceiver 88 of base unit 38 is in communication with transceiver 18 over communication link 42 and with transceiver 90 over communication link 92. Transceiver 90 is coupled to processing unit 85 of base unit 38. Processing unit 85 is coupled to the public switched telephone network ("PSTN") 96 over line 98. In operation, DPP 10 is operable to communicate with two external wireless communication devices. As shown in FIG. 1, DPP 10 communicates with BSS 22 as well as with base unit 38. Processing unit 85 of base unit 38 is also coupled to speaker 87 by line 89, to light source 91 by line 93, and to display 95 by line 97. Processing unit 85 operates to provide feedback to the user through speaker 87, light source 91 and display 95 as was discussed in relation to DPP10. In the case of speaker 87 or light source 91, processing unit 85 produces a signal on lines 89 and 93 to cause sound and light, respectively. In the case of display 95, processing unit 85 produces a signal to cause a symbol or text 99 to be displayed.

As DPP 10 travels away from base unit 38, the signal quality of communication link 42 should decrease. As processing unit 14 of DPP 10 continuously monitors the communication link 42 for signal quality, by way of example, by monitoring bit error rate if the signals of communication link 42 are digital, it will compare calculated signal quality with a threshold signal quality value stored in store 58. When the signal quality of the signals received in communication link 42 decreases beyond a certain amount, as determined by comparing the value stored in store 58 to the calculated value, processing unit 14 will switch from communicating traffic information on communication link 42 with base unit 38 to communicate traffic information on communication link 26 with BSS 22.

As DPP 10 communicates with base unit 38 over link 42 and with BSS 22 over communication link 26, processing unit 14 of DPP 10 must determine positively from which device or system, namely BSS 22 or base unit 38, transmitted the received signal so that processing unit may provide proper feedback to the user by means speaker 66, light source 74 or display 82 to indicate whether BSS 22 or base unit 38 is carrying the traffic from DPP 10. In the embodiment of FIG. 1, transceiver 88 transmits an ID 44 in communication link 42. ID 44 is a value which positively identifies the source of the signal transmission. DPP 10, on the other hand, includes a store 50 for storing a transceiver ID, which transceiver ID corresponds to the ID 44 of base unit 38. Accordingly, whenever a communication signal is received either on communication link 26 or on communication link 42, processing unit 14 analyzes the received signal to determine if it contains ID 44. If the signal does contain ID 44, processing unit 14 determines that communication link 42 is preferred over communication link 26 so long as the signal quality of communication link 42 is within a specified range or below a specified error rate.

Base unit 38 includes transceivers 88 and 90 which are in communication over communication link 92. As may be seen, transceiver 88 is operable to communicate over two communication links, namely, with transceiver 18 over communication link 42 and with transceiver 90 over communication link 92. Transceiver 88 and its antenna is placed in an elevated location, by way of example, in an attic, so that DPP 10 may be able to communicate with base unit 88 throughout a greater coverage area. As may be seen, therefore, base unit 38 is comprised of at least a first portion which includes transceiver 88 and of a second portion which includes processing unit 92 coupled to the PSTN. Under present systems, a base unit's transceiver 90, which transceiver 90 is coupled directly to processing unit 85, communicates directly with the transceiver 18 of dual purpose phone 10. To improve the effectiveness and signal quality of the signals communicated between the base unit and the dual purpose phone, however, a transceiver 88 is added to the base unit 38 to create an additional communication link and to down convert the frequency band from 1900 MHz to a frequency lower than 1900 MHz. Rx/Tx 88 and its antenna for communicating with DPP 10 are placed in an elevated location to facilitate the communications with dual purpose phone 10 as is shown in FIG. 1. Accordingly, the invention includes a first communication link 42 and a second communication link 92 and a transceiver 88 to form a down convert up convert interface between the two communication links 42 and 92 and to create a signal path from dual purpose phone 10 to transceiver 90 and to processing unit 92.

Figure 2:
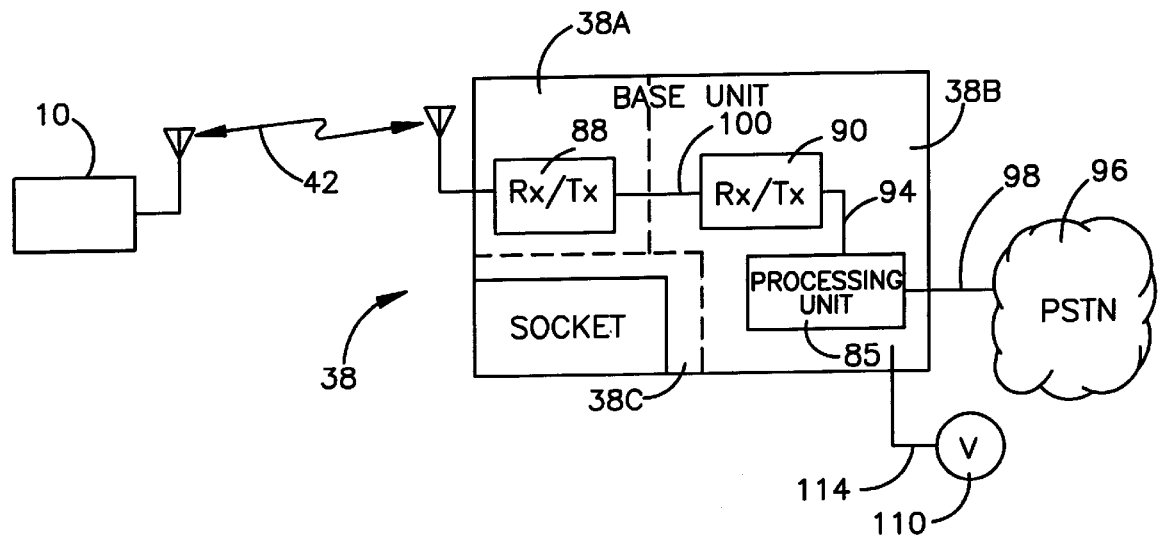
FIG. 2 is a functional block diagram of a second embodiment of a communication system.

Referring now to FIG. 2, there is shown an alternate embodiment of the invention herein. As in FIG. 1, dual purpose phone 10 is coupled to base unit 38 by communication link 42. Transceivers 88 and 90 of base unit 38, however, are coupled by line 100 instead of being in communication through wireless communication link 92. In this embodiment, line 100 is formed of a small diameter coaxial cable capable of carrying a signal of 900 MHz or lower frequency. As may be seen, this embodiment is advantageous in that a line is used which line is less subject to interference than is a wireless link. Additionally line 100, is aesthetically more appealing and is easier to bend and rotate than is a large coaxial cable required to carry a 1900 MHz signal.

A voltage source 110 is coupled to base unit 38. This embodiment of base unit 38 includes a third portion 38C to receive dual purpose phone 10 and to provide electrical power to charge the batteries of dual purpose phone 10. Second portion 38B is operable to communicate to the PSTN 96 while first portion 38A is operable to communicate with DPP 10. The charge for the battery or batteries of DPP 10 is provided by voltage source 110. In this embodiment, voltage source 110 is a one hundred ten volt alternating current wall socket and line 114, which couples voltage source 110 to base unit 38, is a standard power cord.

Figure 3:
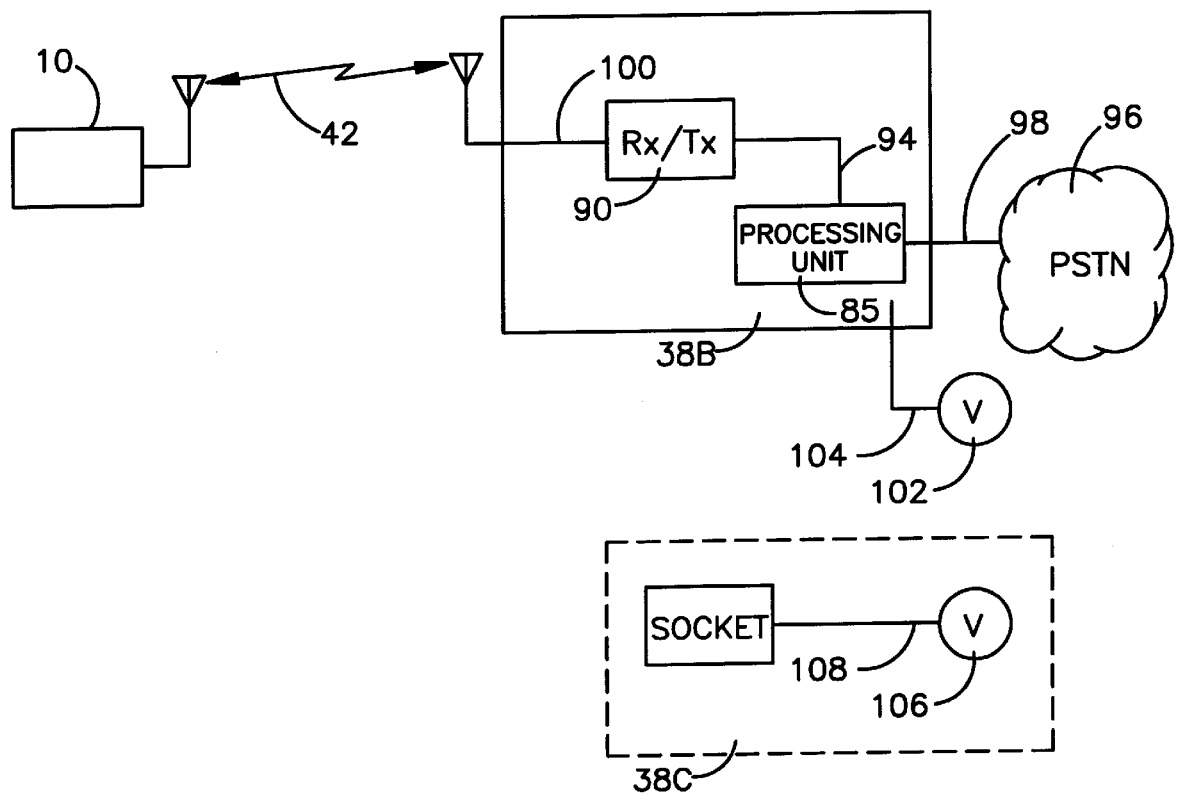
FIG. 3 is a functional block diagram of a third embodiment of a communication system.

Referring now to FIG. 3, a different embodiment of base unit 38 is shown. Third portion 38C of base unit 38 is detached from the second portion 38B. Third portion 38C remains at or near ground level where it is readily accessible to a user for charging the batteries of the dual purpose phone 10. Second portion 38B, however, is located in an elevated position to receive and transmit communication signals over communication link 42. As may be seen, by separating first portion 38A from second portion 38B, the need is eliminated to utilize a second communication link to elevate the antenna for communicating with dual purpose phone 10. As may be seen therefore, second portion 38B is coupled directly to the wireline PSTN 96 networks as before. Moreover, the embodiment of FIG. 3 eliminates the need to utilize two transceivers within the base unit. This embodiment does require, however, that both the first and second portions 38A and 38B must be coupled to voltage sources 102 and 106 by lines 104 and 108, respectively.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A communication system for wireless communications, comprising:
   a dual purpose phone for communicating over a first and a second communication link, the dual purpose phone comprising:
      a processing unit for controlling the operation of the dual purpose phone;
      a first store coupled to the processing unit, the first store for storing a transceiver ID;
      a second store coupled to the processing unit, the second store for storing a signal quality value for comparing against a calculated signal value for a received signal;
      transceiver means for receiving and sending transmission signals from and to the processing unit, said transceiver means also for communicating over the first communication link and over the second communication link; and
      a sensory device coupled to the processing unit, the sensory device for producing a sensation capable of human perception to indicate to the user of the dual purpose phone whether the call is being connected, at least in part, by a cellular network;
   a base station coupled to a wireless communication network, the base station for communicating with said dual purpose phone over the first communication link;
   a base unit coupled to the public switched telephone network ("PSTN"), the base unit for communicating with said dual purpose phone over the second communication link, said base unit including a first portion for transmitting and receiving communication signals over the second communication link and over a wireline public switched telephone network ("PSTN"), the base unit also including a second portion for receiving the dual purpose phone and for charging at least one battery within the dual purpose phone, the first portion further comprising:
      a first transceiver unit for receiving and transmitting communication signals to and from the transceiver of the dual purpose phone over the second communication link, the first transceiver also for receiving and transmitting communication signals over a third communication link; and
      a second transceiver unit for receiving and transmitting communication signals with the first transceiver over the third communication link, the second transceiver also forming an electronic interface between a processing unit coupled to the PSTN and the second communication link.

2. The system of claim 1 wherein the sensory device is a speaker, the speaker for producing a specified sound.

3. The system of claim 1 wherein the sensory device is a light source coupled to the processing unit, the light source for producing light.

4. The system of claim 1 wherein the sensory device is a motorized vibrator for causing the dual purpose phone to vibrate.

5. The system of claim 1 wherein the sensory device is a display for displaying one of a character or a symbol.

6. The system of claim 1 wherein the second communication link is a wireless link.

7. The system of claim 1 wherein the second communication link is a wireline.

8. The system of claim 1 wherein the second communication link is a coaxial cable.

9. A base unit for a cordless phone, the base unit comprising:
- a first portion, comprising:
  - means to couple a power source to the cordless phone battery; and
  - a port to receive the cordless phone wherein the means to couple the power source provide a charge to a battery internal to cordless phone; and
- a second portion comprising:
- a first transceiver for communicating over a first communication link with the cordless phone at a first frequency and for communicating over a second communication link at a second frequency; and
- a second transceiver for communicating over the second communication link with the first transceiver at the second frequency, the second transceiver also for communicating with a standard telephone through a public switched telephone network ("PSTN").

10. A communications system for wireless communications, comprising:
- a dual purpose phone comprising a first transceiver for communicating to a base station coupled to a cellular network over a first communication link;
- a base unit coupled to a public switched telephone network ("PSTN") comprising a first and second transceiver, the first transceiver of the base unit for communicating with the dual purpose phone at a first radio frequency over a second communication link, the second transceiver of the base unit coupled to a processing unit, the second transceiver of the base unit for communication with the first transceiver of the base unit over a third communication link; and
- the base unit further comprising a plurality of sensory signal producing devices coupled to the processing unit, said sensory signal producing devices comprising a speaker, a light source, and a display.

11. The communications system as in claim 10 wherein the dual purpose phone comprises:
- a processing unit; and
- a first store coupled to the processing unit of the dual purpose phone, the first store for storing a transceiver ID; and
- a second store coupled to the processing unit of the dual purpose phone, the second store for storing a signal quality value for comparing against a calculated signal value for a received signal.

12. The communications system as in claim 10 wherein the third communication link is a wireless link.

13. The communications system as in claim 10, wherein the base unit further comprises a means to couple a power source to the dual purpose phone battery and a port to receive the dual purpose phone, wherein the means to couple the power source provides a charge to a battery internal to the dual purpose phone.

* * * * *